(12) United States Patent
Chen

(10) Patent No.: US 9,794,055 B2
(45) Date of Patent: Oct. 17, 2017

(54) DISTRIBUTION OF FORWARDED CLOCK

(71) Applicant: Intel Corporation, Santa Clara, CA (US)

(72) Inventor: Huimin Chen, Portland, OR (US)

(73) Assignee: Intel Corporation, Santa Clara, CA (US)

(\*) Notice: Subject to any disclaimer, the term of this patent is extended or adjusted under 35 U.S.C. 154(b) by 0 days.

(21) Appl. No.: 15/073,298

(22) Filed: Mar. 17, 2016

(65) Prior Publication Data

US 2017/0272231 A1    Sep. 21, 2017

(51) Int. Cl.
*H04L 27/00* (2006.01)
*H04L 7/00* (2006.01)

(52) U.S. Cl.
CPC .......... *H04L 7/0008* (2013.01); *H04L 7/0016* (2013.01)

(58) Field of Classification Search
CPC ... G06F 7/582; G06F 1/04; G06F 1/08; H04L 9/0662; H04L 7/0008
USPC ........ 708/250; 375/367, 295, 355, 365, 366; 327/164, 538, 291, 297, 298, 299
See application file for complete search history.

(56) References Cited

U.S. PATENT DOCUMENTS

| | | |
|---|---|---|
| 2005/0030076 A1 | 2/2005 | Mohanavelu et al. |
| 2007/0152727 A1 | 7/2007 | Lee et al. |
| 2008/0178055 A1 | 7/2008 | Nakamura |
| 2011/0241749 A1 | 10/2011 | Kaviani et al. |
| 2013/0042119 A1* | 2/2013 | Bennett ............... G06F 13/1684 713/300 |

FOREIGN PATENT DOCUMENTS

WO    2015088952 A1    6/2015

OTHER PUBLICATIONS

Winkles, Joe, "Elastic Buffer Implementations in PCI Express Devices," MindShare, Inc., pp. 1-16 (Nov. 2003).
International Search Report and Written Opinion for International Patent Application No. PCT/US2017/017639, 21 pages, dated May 19, 2017.

\* cited by examiner

*Primary Examiner* — Rahel Guarino
(74) *Attorney, Agent, or Firm* — Lowenstein Sandler LLP

(57) ABSTRACT

A source component includes a clock source to generate a clock signal, a plurality of front-end driver circuits to transmit signals to a sink component over a plurality of data lanes of an interconnect, and a clock distribution circuit coupled to the clock source and the plurality of front-end driver circuits. The clock distribution circuit is to distribute a first clock pulse of the clock signal on a first data lane and a second clock pulse of the clock signal on a second data lane. A sink component is to recover the first clock pulse of the clock signal from the first data lane and the second clock pulse of the clock signal from the second data lane, wherein the clock recovery circuit includes clock reconstruction logic to reconstruct the clock signal from the first clock pulse and the second clock pulse.

25 Claims, 8 Drawing Sheets

DISTRIBUTION OF FORWARDED CLOCK

DESCRIPTION OF EMBODIMENTS

Figure 1:
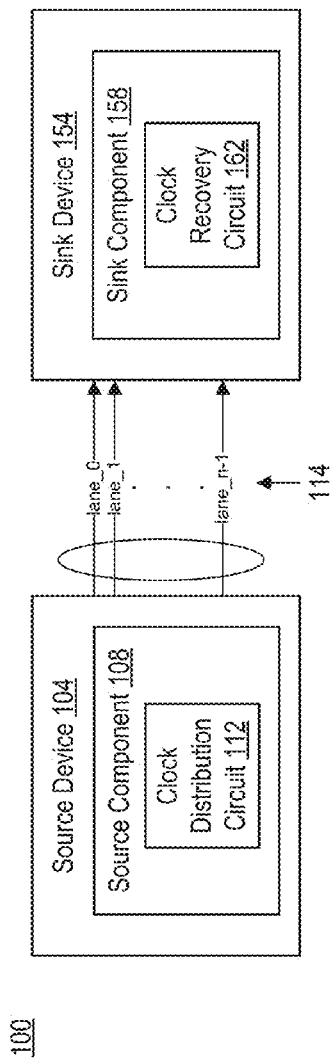
FIG. 1 is a block diagram of a system including interconnected source and sink devices and that illustrates a link topology of an embedded forwarded clock according to an embodiment of the present disclosure.

A data interconnect communicates data from a source device to a sink device timed according to a clock signal. Accordingly, the source device forwards the clock signal to the sink device to synchronize a clock used for timing of data transmission. For data transmission based on the forwarded clock signal, the energy of the clock signal is concentrated on the fundamental and harmonic frequencies of the periodic clock signal, which creates a source of electrical magnetic interference (EMI). If this energy also falls within a radio frequency of a wireless application of the source device or the sink device (or another device in which the source device or sink device is integrated), the forwarded clock signal can also result in radio frequency interference (RFI). With enough RFI, radio performance can be significantly impacted or even make radios inoperable.

Solutions that address potential EMI/RFI of a periodic signal, such as a clock signal, is to either shield a portion of an interconnect that carries the clock signal, or to employ a more stringent transmitter design to constrain the spectral power density of the clock signal. The spectral power density of the clock signal can be constrained by limiting the slew rate or swing amplitude, transmit pulse shaping, or using spread spectrum clocking. All these approaches add either implementation cost or impose more complex transmitter design.

The present disclosure proposes to embed and distribute the forwarded clock into multiple data lanes of an interconnect, thus eliminating a need for a dedicated lane for clock forwarding and effectively eliminating the source of EMI/RFI. As a further step, the clock signal can be pseudo-randomly (or randomly) distributed among the plurality of data lanes, thus further regulating the spectral power density in such a way that can minimize EMI/RFI, and can remove the need for separate design efforts to reduce EMI/RFI impacts, all while preserving the nature of forwarded clocking architecture.

In one embodiment, a source component of a source device can include a clock source to generate a clock signal and a plurality of front-end driver circuits to transmit signals to a sink component over a plurality of data lanes of an interconnect. A clock distribution circuit can be coupled to the clock source and the plurality of front-end driver circuits. The clock distribution circuit can distribute a first clock pulse of the clock signal on a first data lane of the plurality of data lanes and a second clock pulse of the clock signal on a second data lane of the plurality of data lanes. Furthermore, a plurality of sequential clock pulses of the clock signal can be spread out across the plurality of data lanes. In one example, the sequential clock pulses are spread out pseudo-randomly to further reduce any concentration of spectral power across any given data lane.

In a corresponding embodiment, a sink component of a sink device can include a plurality of front-end receiver circuits to receive signals from the source component over the plurality of data lanes of an interconnect. A clock recovery circuit can be coupled to the plurality of front-end receiver circuits and recover a first clock pulse of a clock signal from a first data lane of the plurality of data lanes and recover a second clock pulse of the clock signal from a second data lane of the plurality of data lanes. The clock recovery circuit can include clock reconstruction logic to reconstruct the clock signal from the first clock pulse and the second clock pulse. Furthermore, a plurality of sequential clock pulses of the clock signal can be recovered from within the plurality of data lanes.

In one embodiment, the sequential clock pulses are spread out pseudo-randomly across the plurality of data lanes. In such a case, the source component can transmit a clock distribution pattern (e.g., a pseudo-random pattern or other ordered sequence of lane assignments for sequential clock pulses) to the sink component after initial clock synchronization, so that the sink component can also generate the pseudo-random pattern and know from which data lanes to recover the clock signal.

In a further embodiment, a method can include sequentially distributing, by a source component to a sink component and without data, a plurality of sequential clock pulses of a clock signal across a plurality of data lanes of an interconnect between the source component and the sink component. In response to the sink component reconstructing the clock signal from the plurality of sequential clock pulses recovered from the plurality of data lanes, the method can further include transmitting a clock distribution pattern by the source component to the sink component over at least one of the plurality of data lanes. The method can further include distributing with data, by the source component according to the clock distribution pattern, a first clock pulse of the clock signal on a first data lane of the plurality of data lanes and a second clock pulse of the clock signal on a second data lane of the plurality of data lanes. In one example, the distributing the clock pulses further includes spreading out a plurality of sequential clock pulses of the clock signal interspersed amongst data being transmitted across the plurality of data lanes. In one embodiment, the sequential clock pulses are spread out pseudo-randomly to further reduce any concentration of spectral power across any given data lane.

FIG. 1 is a block diagram of a system 100 including an interconnected source device 104 and sink device 154 and that illustrates a link topology of an embedded forwarded clock according to an embodiment of the present disclosure. The source device 104 can include a source component 108, which in turn includes a clock distribution circuit 112. The sink device 154 can include a sink component 158, which in turn includes a clock recovery circuit 162. The click distribution circuit 112 can distribute sequential pulses of a clock signal (as just discussed) according to a clock distribution pattern (e.g., an ordered sequence of lane assignments for sequential clock pulses) across a plurality of data lanes 114. In one embodiment, the clock distribution pattern is sequential and in another embodiment, the clock distribution pattern is pseudo-random. In yet another example, the clock distribution pattern is random.

The source device 104 can be any computing or data storage device such as a laptop, a computer, a phone or other mobile device, a camera, a printer, a multimedia player or other device. The sink device 154 can also be any computing or storage device to include a laptop, a computer, a monitor, a phone or other mobile device, a camera, a printer, a multimedia player or an input/output (I/O) device such as a keyboard, mouse, external storage device or the like. In one embodiment, the source component 108 can be executed as an integrated circuit or system on a chip (SOC) and be integrated with or incorporated within the source device 104. Furthermore, the sink component 158 can be executed as an integrated circuit or SOC and be integrated with or incorporated within the sink device 154. In one example, the source component 108 and the sink component 158 are integrated within a single, stand-alone system that includes both a source device and a sink device.

In one embodiment, the plurality of data lanes 114 can be a part of any known interconnect, such as multi-drop bus, a point-to-point interconnect, a serial interconnect, a parallel bus, a coherent (e.g., cache coherent) bus, a layered protocol architecture, a differential bus, a Gunning Transceiver Logic (GTL) bus or type of interconnect fabric architecture that can include any forward clocking, multi-lane architecture or a system that employs a short channel interconnect. The interconnect fabric architecture can include a Camera Serial Interface (CSI) or a Display Serial Interface (DSI) of the MIPI Alliance. Another interconnect fabric architecture can include High-Definition Multimedia Interface (HDMI™) of the HDMI Licensing, LLC, or the like.

Furthermore, the clock distribution circuit 112 and the clock recovery circuit 162 can also be integrated within a port of a communication device, such as a Universal Serial Bus (USB) port, Thunderbolt™ port, and any other type of connection or port that are constructed with multiple data lanes. These and other types of technologies that may apply will be discussed in greater detail.

Figure 2:
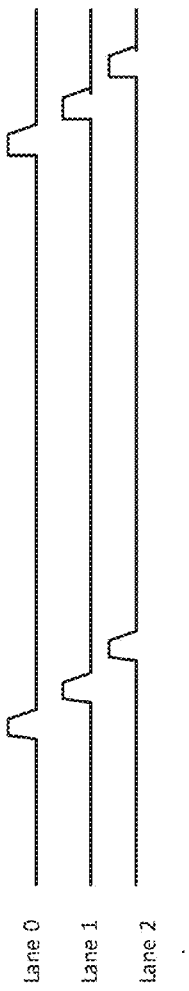
FIG. 2 is a chart illustrating sequential distribution of a forwarded clock across multiple data lanes according to an embodiment of the present disclosure.

FIG. 2 is a chart illustrating sequential distribution of a forwarded clock across multiple data lanes according to an embodiment of the present disclosure. Note that there is no data being transmitted across the plurality of data lanes 114. In the example of FIG. 2, the first clock pulse is placed on Lane_0, the second clock pulse on Lane_1, and so on until lane N−1, and then back to Lane_0 to continue distribution of sequential clock pulses. The sink component 158 may combine all clock pulses together to assemble the forwarded clock signal and perform lane-to-lane de-skew introduced due to delay variance from each data lane of the plurality of data lanes 114.

Figure 3:
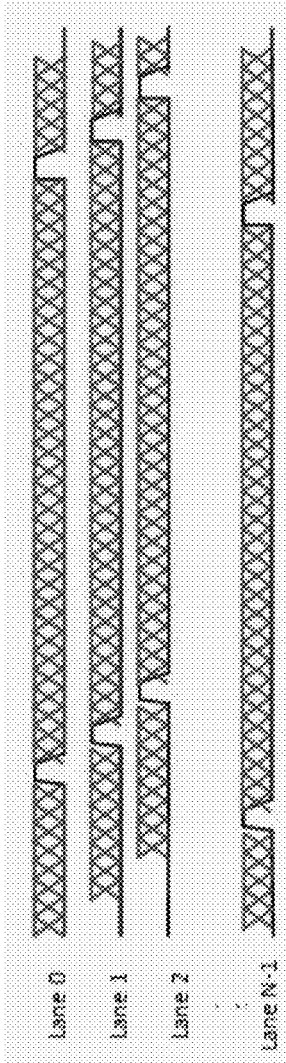
FIG. 3 is a chart illustrating data transmissions on the multiple data lanes with the sequential distribution of the forwarded clock of FIG. 2, according to one embodiment.

Once the clock recovery circuit 162 recovers sequential clock pulses and reconstructs the forwarded clock signal from the sequential clock pulses, the clock distribution circuit 112 can start transmitting data interspersed with sequential clock pulses of the forwarded clock signal as shown in FIG. 3. For example, the clock recovery circuit 162 can use the reconstructed clock (from FIG. 2) to sample the inputs from respective data lanes, sequentially at the correct time to continue reconstructing the forwarded clock signal despite the sequential clock pulses being interspersed amongst the data.

More specifically, the sequential distribution of the clock in FIG. 3 includes a first clock cycle in which the clock distribution circuit 112 transmits the first clock pulse on Lane_0 while transmitting non-clock data on one or more of the other data lanes (e.g., Lane_1, Lane_2, and Lane_n−1). Similarly, during a second clock cycle, the clock distribution circuit 112 can transmit a second clock pulse on Lane_1 while transmitting non-clock data on one or more of the other data lanes (e.g., Lane_0, Lane_2, and Lane_n−1). Further, during a third clock cycle, the clock distribution circuit 112 can transmit a third clock pulse on Lane_2 while transmitting non-clock data on one or more other lanes (e.g., Lane_0, Lane_1, and Lane_n−1). The clock distribution circuit 112 can continue to sequentially transmit the sequential clock pulses in this way through Lane_n−1 and starting back again at Lane_0 and so on, to transmit the sequential clock pulses to the sink device 154. Where the sequential pattern is known to the clock recovery circuit 162, the clock recovery circuit 162 recovers the clock pulses and reconstructs the clock.

The approach of FIGS. 2 and 3 eliminates sending the forward clock pulses across a single data lane, thus reducing the EMI/RFI due to the forwarded clock signal. Because each clock pulse is distributed among data lanes in a periodic fashion, however, a spectral power density can still exist around 1/N of the frequency of the clock ($f_{clk}$) and its harmonics in each data lane, where N is the number of data lanes. Even though this potential EMI/RFI due to this distributed clock signal can be suppressed by providing shielding for data lanes, the EMI/RFI can still be problematic if spectral power density of the clock signal is more significant than that of the data being transmitted across the plurality of data lanes 114, or if any RFI still interferes with existing wireless signals.

To further reduce the potential EMI/RFI due to an distributed clock signal interspersed across data lanes, the source component 108 can distribute the sequential clock pulses of the clock signal pseudo-randomly (or randomly) instead of periodically or sequentially. So long as both the source component 108 and the sink component 158 know a clock distribution pattern being used, the clock recovery circuit 162 can still reconstruct the forwarded clock signal by extracting the clock pulses on corresponding data lanes based on the clock distribution pattern.

Figure 4:
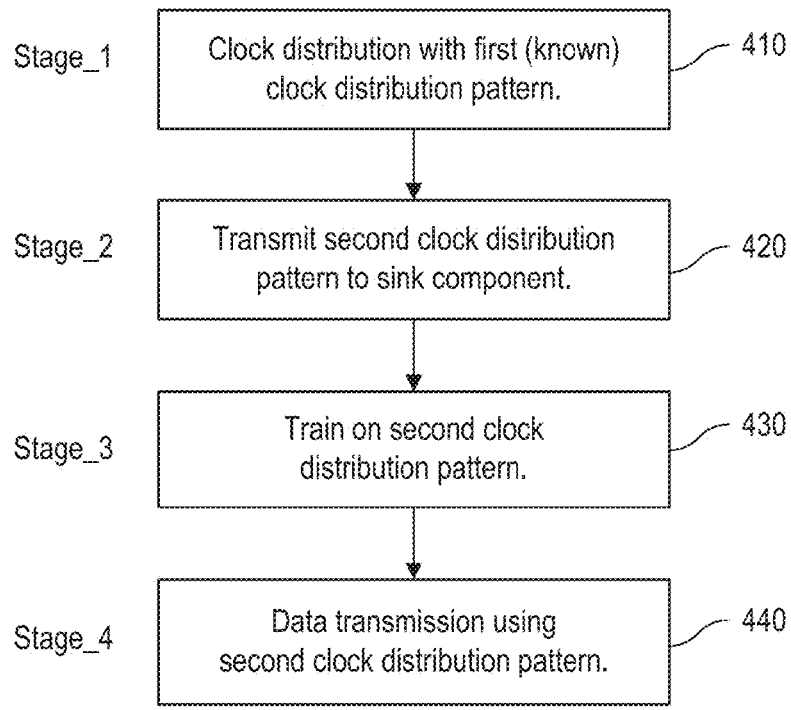
FIG. 4 is a flow chart of a method of distributing a forwarded clock according to an embodiment of the present disclosure.

FIG. 4 is a flow chart of a method of distributing a forwarded clock according to an embodiment of the present disclosure. At Stage_1, the clock distribution circuit 112 can perform distribution of the clock pulses across the plurality of data lanes according to a first clock distribution pattern known to both the source component and the sink component (410). In one embodiment, the first clock distribution pattern is a sequential pattern (as in FIG. 2) or a periodic pattern with regular changes across the data lanes. The clock recovery circuit 162 can then reconstruct the clock signal by recovering the clock pulses and combining them. The clock recovery circuit 162 can further perform lane-to-lane de-skew, e.g., calculate delay variances for slight changes in signal arrival due to lane inconsistencies and the like. Stage_1 thus provides the initial clock reconstruction such that data can then be successfully transmitted between the source device and the sink device.

At Stage_2, the clock distribution circuit 112 can then transmit to the clock recovery circuit 162 (of the sink component) a second clock distribution pattern that is not yet known to the clock recovery circuit 162 (420). If the second clock distribution pattern is to be used within data transmission and is already known to the clock recovery circuit 162, Stage_1 can be skipped, and is thus optional in some cases. The second distribution pattern can be defined or formulated in various ways in keeping with the purpose of minimizing EMI/RFI. For example, a pattern can be defined to broaden spectral density due to the clock signal, to reduce EMI. The pattern can also be defined to shift the spectral energy of the clock signal out of a certain RF band of interest. An example of a set of second distribution patterns that can be defined and from which the clock distribution circuit 112 can select is shown in Table 1, where PRBSn stands for pseudo-random binary sequence of "n" bits.

TABLE 1

| Byte [b7:b0] | Clock Distribution Pattern | Note |
| --- | --- | --- |
| 0000, 0000 | Sequential Clock Distribution | Default clock distribution |
| 0000, 0001 | PRBSn | Scrambler-based pseudo-random clock distribution |
| 0000, 0010~ | Application Specific Distribution | Application specific clock distribution pattern |

The second distribution pattern can be any polynomial that provides for pseudo-random shifting of the data lane over which each sequential pulse of the clock signal is to be distributed. The application specific distribution can include any different or proprietary clock distribution pattern. In one example, the clock distribution circuit 112 distributes a first clock cycle of the clock signal in which a first clock is transmitted on the first data lane and first data is transmitted on the second data lane, and a second clock cycle of the clock signal in which a second clock is transmitted on the second data lane and second data is transmitted on the first data lane.

Once the clock recovery circuit 162 has received the second clock distribution pattern, the method can enter Stage_3, to synchronize the clock signal on the second clock distribution by training on the second clock distribution pattern (430). To perform Stage_3 training, the clock distribution circuit 112 can pseudo-randomly (or randomly) transmit, without data, the plurality of sequential clock pulses across the plurality of the data lanes according to the second clock distribution pattern. This allows the clock recovery circuit 162 to synchronize with recovering the clock pulses from each respective data lane as determined by the second clock distribution pattern without interference from transmission data. Stage_3 is optional, however, to the extent the clock recovery circuit 162 has already performed lane-to-lane de-skew and received the second clock distribution policy from the clock distribution circuit in Stage_1 and Stage_2, respectively.

In Stage_4, once the clock signal is synchronized between the clock distribution circuit 112 and the clock recovery circuit 162, the clock distribution circuit 112 transmits data interspersed with clock pulses of the clock signal according to the second clock distribution pattern, which is now known to the clock recovery circuit 162 (440). The clock recovery circuit 162 can thus employ the second clock distribution pattern to recover sequential clock pulses, and combine them to reconstruct the clock signal from the plurality of data lanes.

Figure 5:
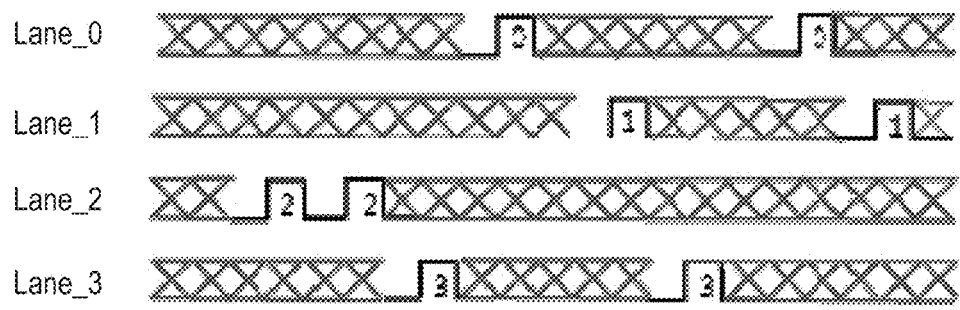
FIG. 5 is a chart illustrating pseudo-random distribution of a plurality of sequential clock pulses distributed across multiple data lanes during data transmission, according to an embodiment of the present disclosure.

FIG. 5 is a chart illustrating pseudo-random distribution of a plurality of sequential clock pulses distributed across multiple data lanes during data transmission, according to an embodiment of the present disclosure. In the example shown in FIG. 4, a PRBS15 is used as an example, and N (number of data lanes) is assumed to be 4. The 16-bits of pseudo-random data generated by PRBS15 is divided into 8 subgroups, each containing two bits that designates the data lane on which a clock signal is transmitted. For example, a first subgroup can be [b1-b0], a second subgroup can be [b3-b2], a third subgroup can be [b5-b4], a fourth subgroup can be [b7-b6], a fifth subgroup can be [b9-b8], a sixth subgroup can be [b11-b10], a seventh subgroup can be [b14-b13], and an eighth can be subgroup [b15-b14].

Accordingly, if the PRBS15 value is "0100, 1101, 0011, 1010," then the clock distribution pattern is sequentially on lanes 2-2-3-0-1-3-0-1. The clock recovery circuit 162, upon synchronizing its own scrambler (or pseudo-random number generator) with the clock distribution circuit 112, can reconstruct the forwarded clock signal according to the sequential clock pulses distributed following PRBS15. Since PRBS15 is 16-bits wide, PRBS15 can advance once every eight (8) clock cycles. When N=8, four subgroups can be generated for each scrambler value, and therefore, PRBS15 advances once every 4 clock cycles. One can also use PRBS31 (or some other pseudo-random polynomial or binary sequence) to achieve better random clock distribution.

Because a scrambler (or pseudo-random number generator) is a pseudo-random process, the distribution of the clock pulses is also pseudo-random, and hence the spectral energy of the clock pulses among the plurality of data lanes is whitened.

Figure 6:
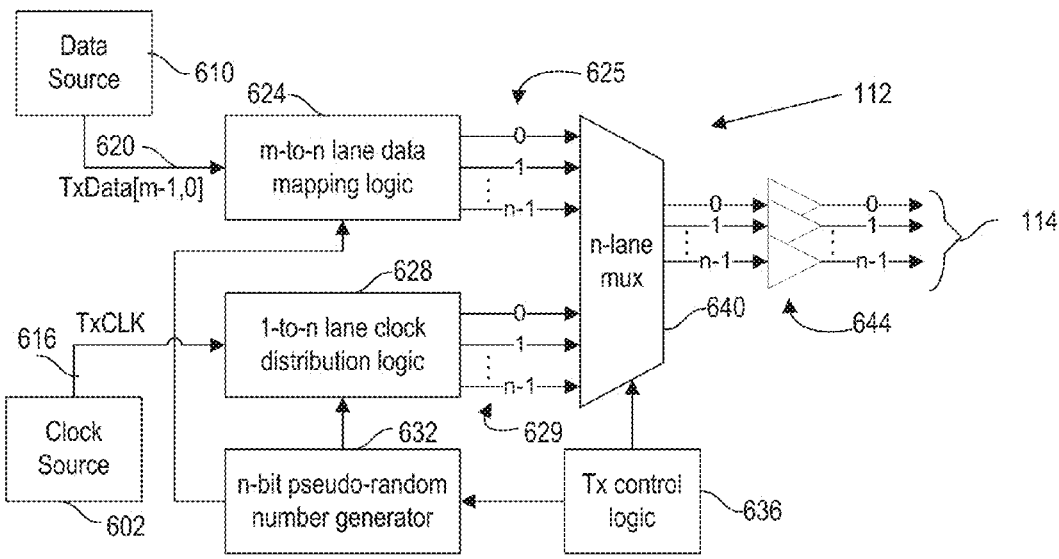
FIG. 6 is a block diagram of a clock distribution circuit that feeds front-end driver circuits, according to an embodiment of the present disclosure.

FIG. 6 is a block diagram of a clock distribution circuit 112 that feeds a plurality of front-end driver circuits 644, according to an embodiment of the present disclosure. Different and varied circuitry is envisioned; accordingly, the embodiment of FIG. 6 is only one example of an implementation of a clock distribution circuit. The clock distribution circuit 112 can include, but not be limited to, a clock source 602, a clock signal (TxCLK) 616, a data source 610, a data signal (TxData[m-1,0]) 620, m-to-n lane data mapping logic 624, 1-to-n lane clock distribution logic 628, an n-bit pseudo-random number generator 632, a transmission control logic 636, an n-lane multiplexer 640 (or other selection control logic) having first inputs 625 (for distributed data) and second inputs 629 (for distributed clock pulses). The outputs from the multiplexer 640 feed respective front-end driver circuits 644, which drive the data and clock pulses down each respective of the plurality of data lanes 114.

In the present example, the 1-to-n lane clock distribution logic 628 maps the clock signal 616 onto n lanes, where "n" is the number of physical data lanes of the interconnect, although not all n lanes need to be used for the clock distribution. The m-to-n lane data mapping logic 624 maps the data signal 620 between m data lanes (from the data source 610) to the n data lanes of the interconnect. The n-bit pseudo-random number generator 632 generates a pseudo-random number as directed by the transmission control logic 636 or directed by the source component 108. The transmission control logic 636 is coupled to the pseudo-random number generator 632 and to the n-lane multiplexer 640, and includes a state machine or similar logic to direct the transmission operation of the clock distribution circuit in each stage (Stage_1 through Stage_4) as discussed with reference to FIG. 4.

In one embodiment, the source component 108 can signal the transmission control logic 636 to choose a different clock distribution pattern depending on differing platform demands of the system 100 in which EMI/RFI can vary, e.g., the spectral density changes frequency or intensity in a pre-defined way for which a new clock distribution pattern is triggered. In one embodiment, a selection control signal includes a byte such as displayed in Table 1 to direct the transmission control logic 636 to trigger generation of a new clock distribution pattern by the n-bit pseudo-random number generator 632.

The n-lane multiplexer 640 receives the mapped data (from the m-to-n lane data mapping logic 624) on the first inputs 625 and mapped, sequential clock pulses of the clock signal (from the 1-to-n lane clock distribution logic 628) on the second inputs 629. The transmission control logic 636 can then direct selection of which of the first inputs 625 and/or the second inputs 629 to output from the n-lane multiplexer 640 according to stage of operation and the currently employed clock distribution pattern. When performing a training stage, the multiplexer 640 can be directed to output just the clock pulses according to the clock distribution pattern. When performing data transmission, the multiplexer 640 can be directed to embed the clock pulses within mapped data across the plurality of data lanes 114, according to the current clock distribution pattern.

Figure 7:
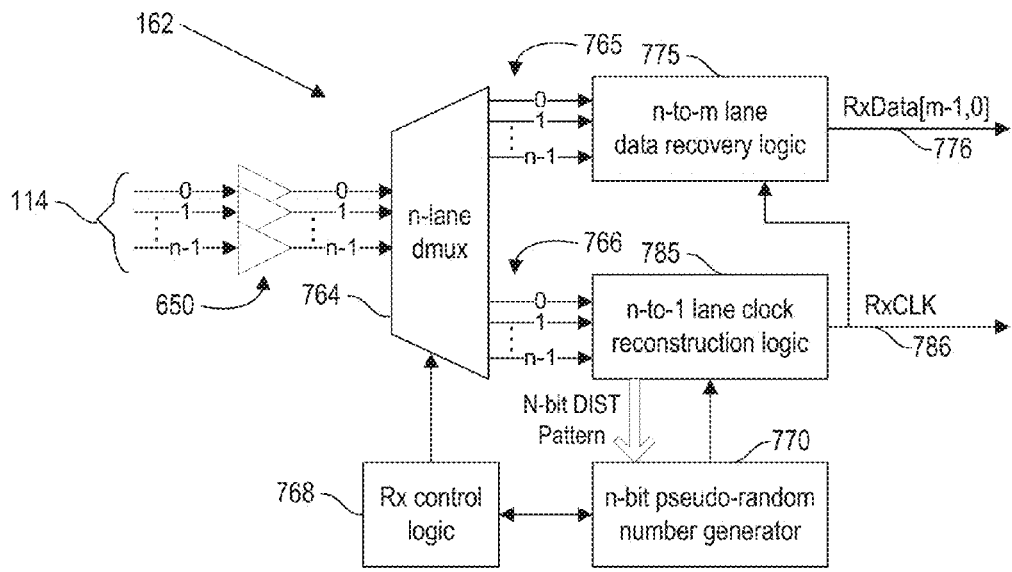
FIG. 7 is a block diagram of a clock recovery circuit that recovers a clock from a front-end receiver circuits, according to an embodiment of the present disclosure.

FIG. 7 is a block diagram of a clock recovery circuit 162 that recovers a clock from a plurality of front-end receiver circuits 650, according to an embodiment of the present disclosure. Different and varied circuitry is envisioned; accordingly, the embodiment of FIG. 6 is only one example of an implementation of a clock recovery circuit. The clock recovery circuit 162 includes, but is not limited to, an n-lane demultiplexer 764 including first outputs 765 for data and second outputs 766 for clock pulses, reception control logic 768, an n-bit pseudo-random number generator 770, an n-to-m lane data recovery logic 775 to generate a reconstructed data signal (RxData[m-1,0]) 776, and an n-to-1 lane clock reconstruction logic 785 to generate a reconstructed clock signal (RxCLK) 786.

In one embodiment, the plurality of front-end receiver circuits 650 receive the corresponding outputs driven down the interconnect by the front-end driver circuits 644 from the clock distribution circuit 112. The front-end receiver circuits 650 can then input the signal(s) on each respective data lane into the demultiplexer 764 with which the front-end receiver circuits 650 are coupled. The reception control logic 768 can then direct the demultiplexer 764 to place the data from the plurality of data lanes on the first outputs 765 (when there is data available) and to place the plurality of sequential clock pulses on the second outputs 766, according to a particular stage of operation (as per FIG. 4) and a current clock distribution pattern, e.g., as predetermined or as received from the n-bit pseudo-random number generator 770.

In particular, the reception control logic 768 can know an initial (or first) clock distribution pattern, such as a periodic or sequential clock distribution pattern, and direct the recovery of the clock pulses by the demultiplexer 764 according to this known pattern, as in Stage_1 of FIG. 1. This can occur at initial start-up or when the clock recovery circuit 162 is first powered on by the sink component 158. Once recovered, the clock reconstruction logic 785 may combine the clock pulses in a proper order (e.g., with use of an XOR as the clock pulses are received), to reconstruct the clock signal 786.

By initially synchronizing with the clock signal of the clock distribution circuit in this way, the clock recovery circuit 162 can now receive any pseudo-random (or random) clock distribution pattern to be used in data transmission, as per Stage_2 (FIG. 4). For example, the n-to-1 lane clock reconstruction logic 785 can reconstruct the clock signal based on an N-bit clock distribution pattern obtained from the incoming data signals on the n data lanes 114. In one embodiment, a selection control signal recovered from the data lane(s) includes a byte such as displayed in Table 1 to direct the reception control logic 768 to recover clock pulses off predetermined data lanes in a predetermined order, e.g., according to a particular polynomial and seed value in one example. This pseudo-random clock distribution pattern can be a second or subsequent clock distribution pattern different than the initial (or first) click distribution pattern.

After reception of the clock distribution pattern, the n-bit pseudo-random number generator 770 can be executed as per the received, pseudo-random clock distribution pattern. At this point, the clock recovery circuit 162 can perform optional Stage_3 training as discussed with reference to FIG. 4, to ensure synchronization with the clock signal 616 from the clock source before data transmission. The clock recovery circuit 162 can also, alternatively or additionally, move to Stage_4 reception of data transmission and recovery/reconstruction of the clock signal 786. In either Stage_3 or Stage_4, however, the clock recovery circuit 162 can use the received clock distribution pattern by which to direct the demultiplexer to output the sequential clock pulses on the second outputs 766, which the n-to-1 lane clock reconstruction logic 785 can combine to reconstruct the received clock signal 786 (RxCLK). Again, an exclusive OR (XOR) or other type of combination logic can be used to reconstruct the clock signal from the recovered clock pulses.

Within Stage_4, the reception control logic 768 can also direct the recovery of data from the data lanes 114 onto the first outputs 765. The lane data recovery logic 775 can then map the received data to a reconstructed data signal 776, e.g., from n data lanes 114 to m data sink lanes of the sink device 154.

Figure 8:
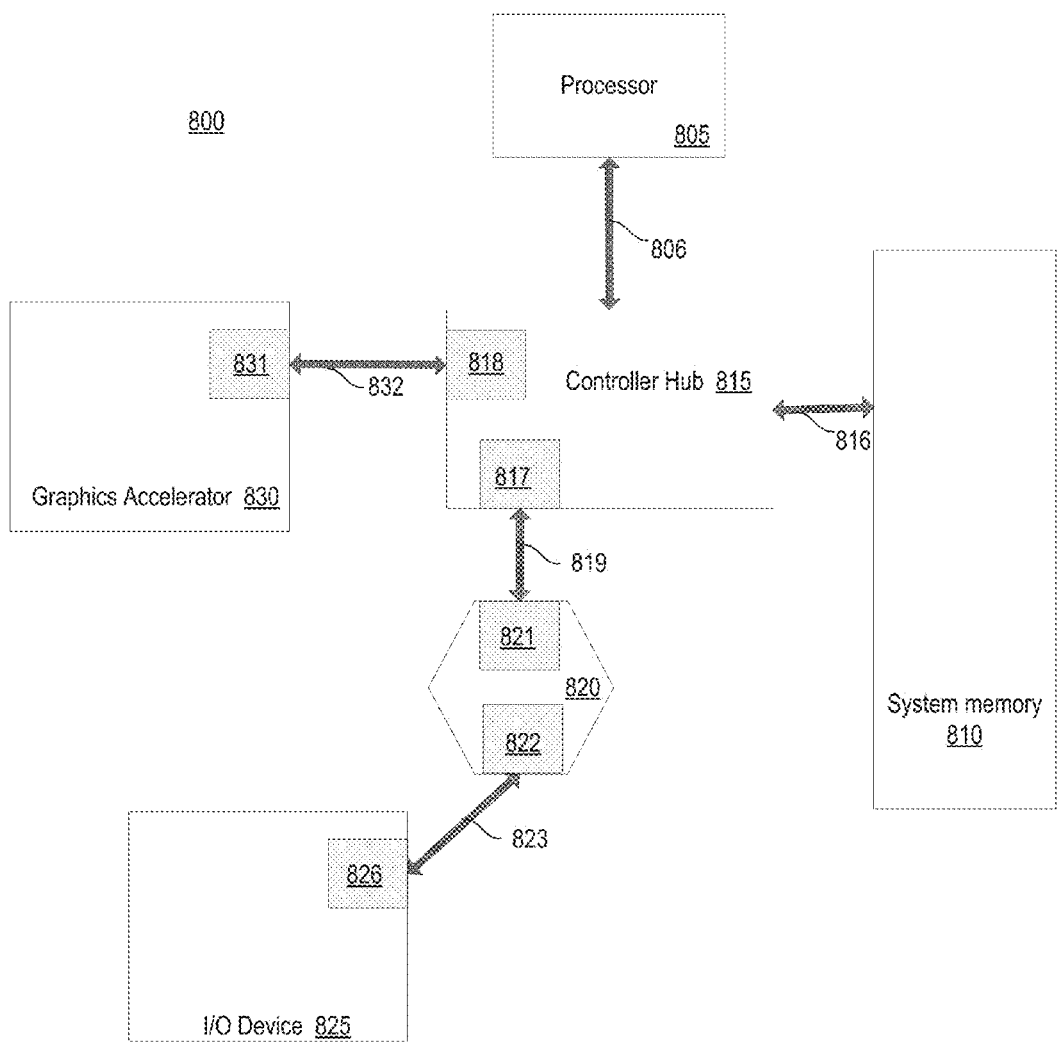
FIG. 8 is a block diagram of a computing system including an interconnect fabric architecture, according to an embodiment of the present disclosure.

FIG. 8 is a block diagram of a computing system including an interconnect fabric architecture, according to an embodiment of the present disclosure. Referring to FIG. 8, an embodiment of a fabric composed of point-to-point links that interconnect a set of components is illustrated. System 800 includes processor 805 and system memory 810 coupled to controller hub 815. Processor 805 includes any processing element, such as a microprocessor, a host processor, an embedded processor, a co-processor, or other processor. Processor 805 is coupled to controller hub 815 through front-side bus (FSB) 806. In one embodiment, FSB 806 is a serial point-to-point interconnect as described below. In another embodiment, link 806 includes a serial, differential interconnect architecture that is compliant with different interconnect standards.

System memory 810 includes any memory device, such as random access memory (RAM), non-volatile (NV) memory, or other memory accessible by devices in system 800. System memory 810 is coupled to controller hub 815 through memory interface 816. Examples of a memory interface include a double-data rate (DDR) memory interface, a dual-channel DDR memory interface, and a dynamic RAM (DRAM) memory interface.

In one embodiment, controller hub 815 is a root hub, root complex, or root controller in a PCIe® (or PCIE®) interconnection hierarchy, although can also exist within other point-to-point, serial, differential, layered protocol or interconnect fabric architectures by way of example. Examples of controller hub 815 include a chipset, a memory controller hub (MCH), a Northbridge, an interconnect controller hub (ICH) a Southbridge, and a root controller/hub. Often the term chipset refers to two physically separate controller hubs, i.e. a memory controller hub (MCH) coupled to an interconnect controller hub (ICH). Note that current systems often include the MCH integrated with processor 805, while controller hub 815 is to communicate with I/O devices, in a similar manner as described below. In some embodiments, peer-to-peer routing is optionally supported through root complex 815.

Here, controller hub 815 is coupled to switch/bridge 820 through serial link 819. Input/output modules 817 and 821, which can also be referred to as interfaces/ports 817 and 821, include/implement a layered protocol stack to provide communication between controller hub 815 and switch 820. In one embodiment, multiple devices are capable of being coupled to switch 820.

Switch/bridge 820 routes packets/messages from device 825 upstream, i.e. up a hierarchy towards a root complex, to controller hub 815 and downstream, i.e. down a hierarchy away from a root controller, from processor 805 or system memory 810 to device 825. Switch 820, in one embodiment, is referred to as a logical assembly of multiple virtual PCI-to-PCI bridge devices. Device 825 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a FireWire® device, a Universal Serial Bus (USB) device, a scanner, and other input/output devices. Often in the PCIe® vernacular, such a device is referred to as an endpoint. Although not specifically shown, device 825 can include a PCIe® to PCI/PCI-X bridge to support legacy or other version PCI™ devices. Endpoint devices in PCIe are often classified as legacy, PCIe®, or root complex integrated endpoints.

Graphics accelerator 830 is also coupled to controller hub 815 through serial link 832. In one embodiment, graphics accelerator 830 is coupled to an MCH, which is coupled to an ICH. Switch 820, and accordingly I/O device 825, is then coupled to the ICH. I/O modules 831 and 818 are also to implement a layered protocol stack to communicate between graphics accelerator 830 and controller hub 815. Similar to the MCH discussion above, a graphics controller or the graphics accelerator 830 itself can be integrated in processor 805.

Figure 9:
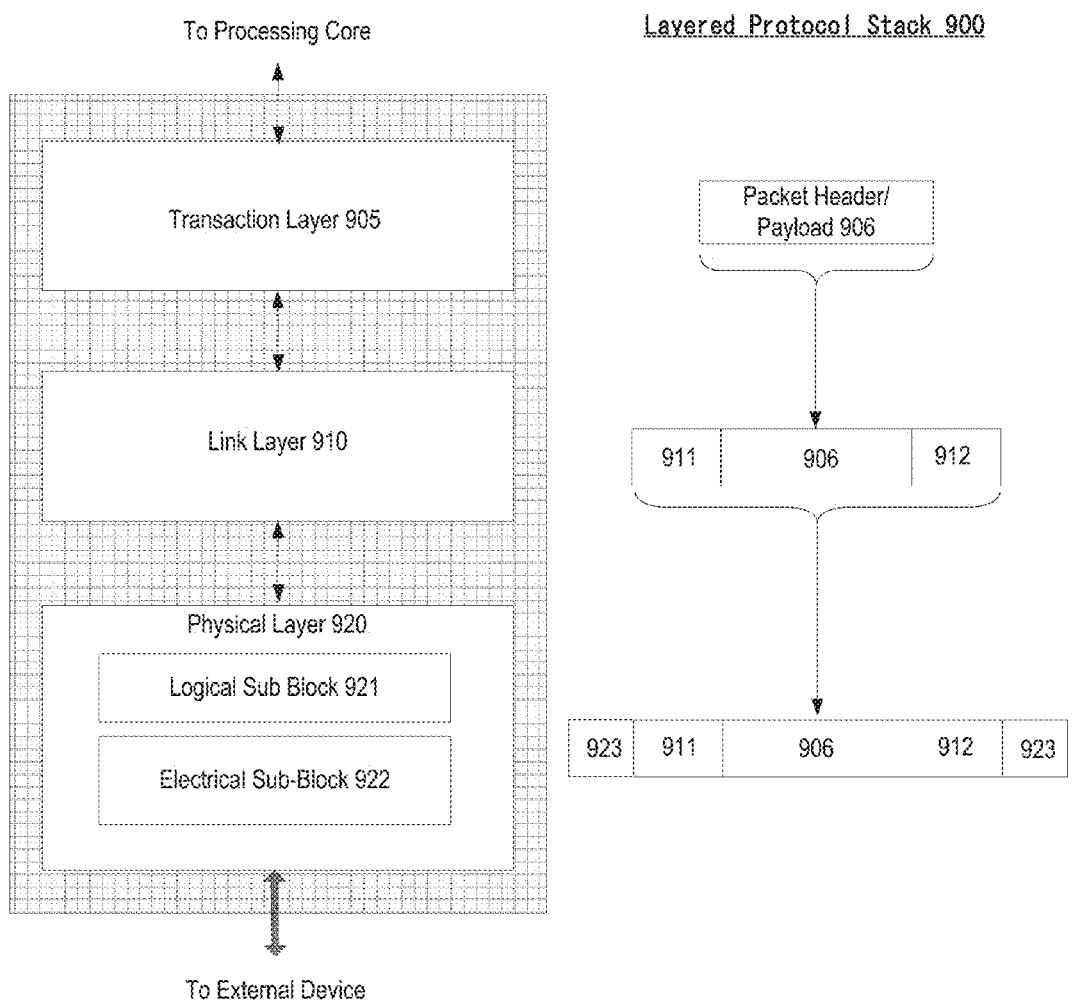
FIG. 9 is a block diagram of an interconnect fabric architecture including a layered stack, according to an embodiment of the present disclosure.
Figure 10:
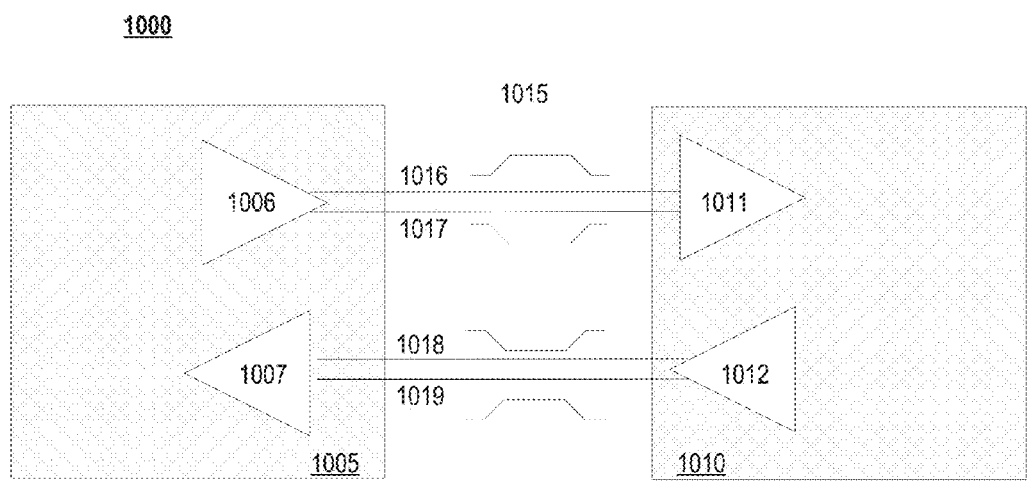
FIG. 10 is a block diagram of a transmitter and receiver pair usable within an interconnect fabric architecture or a serial point-to-point interconnect fabric, according to an embodiment of the present disclosure.

Turning to FIG. 9, an embodiment of a layered protocol stack is illustrated. Layered protocol stack 900 includes any form of a layered communication stack, such as a Quick Path Interconnect (QPI) stack, a PCIe® stack, a next generation high performance computing interconnect stack, or other layered stack. Although the discussion immediately below in reference to FIGS. 8-10 are in relation to a PCIe® stack, the same concepts can be applied to other interconnect stacks. In one embodiment, protocol stack 900 is a PCIe protocol stack including transaction layer 905, link layer 910, and physical layer 920. An interface, such as interfaces 817, 818, 821, 822, 826, and 831 in FIG. 8, can be represented as communication protocol stack 900. Representation as a communication protocol stack can also be referred to as a module or interface implementing/including a protocol stack.

In one embodiment, interfaces 817, 818 and 822 can be a source component 108 and include a clock distribution circuit 112, which are discussed with reference to FIGS. 1-7. Similarly, interfaces 821, 831 and 826 can be a sink component 158 and include a clock recovery circuit 162, which are also discussed with reference to FIGS. 1-7. Accordingly, a clock signal from one of interfaces 817, 818 or 822 can be distributed to one of the interfaces 821, 831 or 826, respectively, according to a clock distribution pattern as discussed herein, and be recovered/reconstructed by a clock recovery circuit 162 within the interface 821, 831 or 826.

PCI Express® uses packets to communicate information between components. Packets are formed in the transaction layer 905 and data link layer 910 to carry the information from the transmitting component to the receiving component. As the transmitted packets flow through the other layers, they are extended with additional information necessary to handle packets at those layers. At the receiving side the reverse process occurs and packets get transformed from their physical layer 920 representation to the data link layer 910 representation and finally (for transaction layer packets) to the form that can be processed by the transaction layer 905 of the receiving device.

Transaction Layer

In one embodiment, transaction layer 905 is to provide an interface between a device's processing core and the interconnect architecture, such as data link layer 910 and physical layer 920. In this regard, a primary responsibility of the transaction layer 905 is the assembly and disassembly of packets (e.g., transaction layer packets, or TLPs). The translation layer 905 typically manages credit-base flow control for TLPs. PCIe® implements split transactions, i.e. transactions with request and response separated by time, allowing a link to carry other traffic while the target device gathers data for the response.

In addition, PCIe® utilizes credit-based flow control. In this scheme, a device advertises an initial amount of credit for each of the receive buffers in transaction layer 905. An external device at the opposite end of the link, such as controller hub 815 in FIG. 8, counts the number of credits consumed by each TLP. A transaction can be transmitted if the transaction does not exceed a credit limit. Upon receiving a response, an amount of credit is restored. An advantage of a credit scheme is that the latency of credit return does not affect performance, provided that the credit limit is not encountered.

In one embodiment, four transaction address spaces include a configuration address space, a memory address space, an input/output (I/O) address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe® devices. Transactions to the configuration space include read requests and write requests. Message space transactions (or, simply messages) are defined to support in-band communication between PCIe® agents.

Therefore, in one embodiment, transaction layer 905 assembles packet header/payload 906. Format for current packet headers/payloads can be found in the PCIe® specification at the PCIe® specification website.

Link Layer

Link layer 910, also referred to as data link layer 910, acts as an intermediate stage between transaction layer 905 and the physical layer 920. In one embodiment, a responsibility of the data link layer 910 is providing a reliable mechanism for exchanging transaction layer packets (TLPs) between two components a link. One side of the data link layer 910 accepts TLPs assembled by the transaction layer 905, applies packet sequence identifier 911, i.e. an identification number or packet number, calculates and applies an error detection code, i.e. CRC 912, and submits the modified TLPs to the physical layer 920 for transmission across a physical to an external device.

Physical Layer

In one embodiment, physical layer 920 includes logical sub-block 921 and electrical sub-block 922 to physically transmit a packet to an external device. Here, logical sub-block 921 is responsible for the "digital" functions of physical layer 920. In this regard, the logical sub-block includes a transmit section to prepare outgoing information for transmission by electrical (e.g., physical) sub-block 922, and a receiver section to identify and prepare received information before passing it to the Link Layer 910.

In one embodiment, the electrical sub-block 922 includes a transmitter and/or a receiver, and can therefore include the clock distribution circuit 112 (for transmission), the clock recovery circuit 162 (for reception) or both the clock distribution circuit 112 and the clock recovery circuit 162 (for both transmission and reception, respectively). In this way, a clock distribution pattern may be used to distribute a clock from the physical layer 920 of a transmitting device (e.g., from a clock distribution circuit 112 a source device 104) to a physical layer 920 of a receiving device (e.g., to a clock recovery circuit 162 of a sink device 154), as described in FIGS. 1-7.

The transmitter can also, alternatively or additionally, be supplied by logical sub-block 921 with symbols, which the transmitter serializes and transmits onto to an external device. The receiver is supplied with serialized symbols from an external device and transforms the received signals into a bit-stream. The bit-stream is de-serialized and supplied to logical sub-block 921. In one embodiment, an 8b/10b transmission code is employed, where ten-bit symbols are transmitted/received. Here, special symbols can be used to frame a packet with frames 923. In addition, in one example, the receiver also provides a symbol clock recovered/reconstructed from the incoming serial stream.

As stated above, although transaction layer 905, link layer 910, and physical layer 920 are discussed in reference to a specific embodiment of a PCIe® protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

FIG. 10 is a block diagram of a transmitter and receiver pair 1000 usable within an interconnect fabric architecture and within a serial point-to-point fabric, according to an embodiment of the present disclosure. Although an embodiment of a PCIe® serial point-to-point link is illustrated, a serial point-to-point link is not so limited, as it includes any transmission path for transmitting serial data. In the embodiment shown, a basic PCIe® link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device 1010. In other words, two transmitting paths, i.e. paths 1016 and 1017, and two receiving paths, i.e. paths 1018 and 1019, are included in a PCIe® link.

In one embodiment, transmission logic 1006 and 1012 can each include a clock distribution circuit 112 such as displayed in and discussed with reference to FIG. 6. Further, the receiving logic 1011 and 1007 can each include a clock recovery circuit 162 as displayed in and discussed with reference to FIG. 7. In this way, the device 1005 can distribute a clock distribution pattern and perform clock distribution to the device 1010 with the clock distribution pattern, as discussed with reference to FIGS. 1-7. Similarly, the device 1010 can distribute a clock distribution pattern and perform clock distribution to the device 1005 with the clock distribution pattern, as discussed with reference to FIGS. 1-7.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 1015. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In one embodiment, the transmission logic 1006 or 1012 can include or make up a part of the clock distribution circuit 112. Similarly, the receiving logic 1007 or 1011 can include or make up a part of the clock recovery circuit 162.

A differential pair refers to two transmission paths, such as lines 1016 and 1017, to transmit differential signals. As an example, when line 1016 toggles from a low voltage level to a high voltage level, i.e. a rising edge, line 1017 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 11:
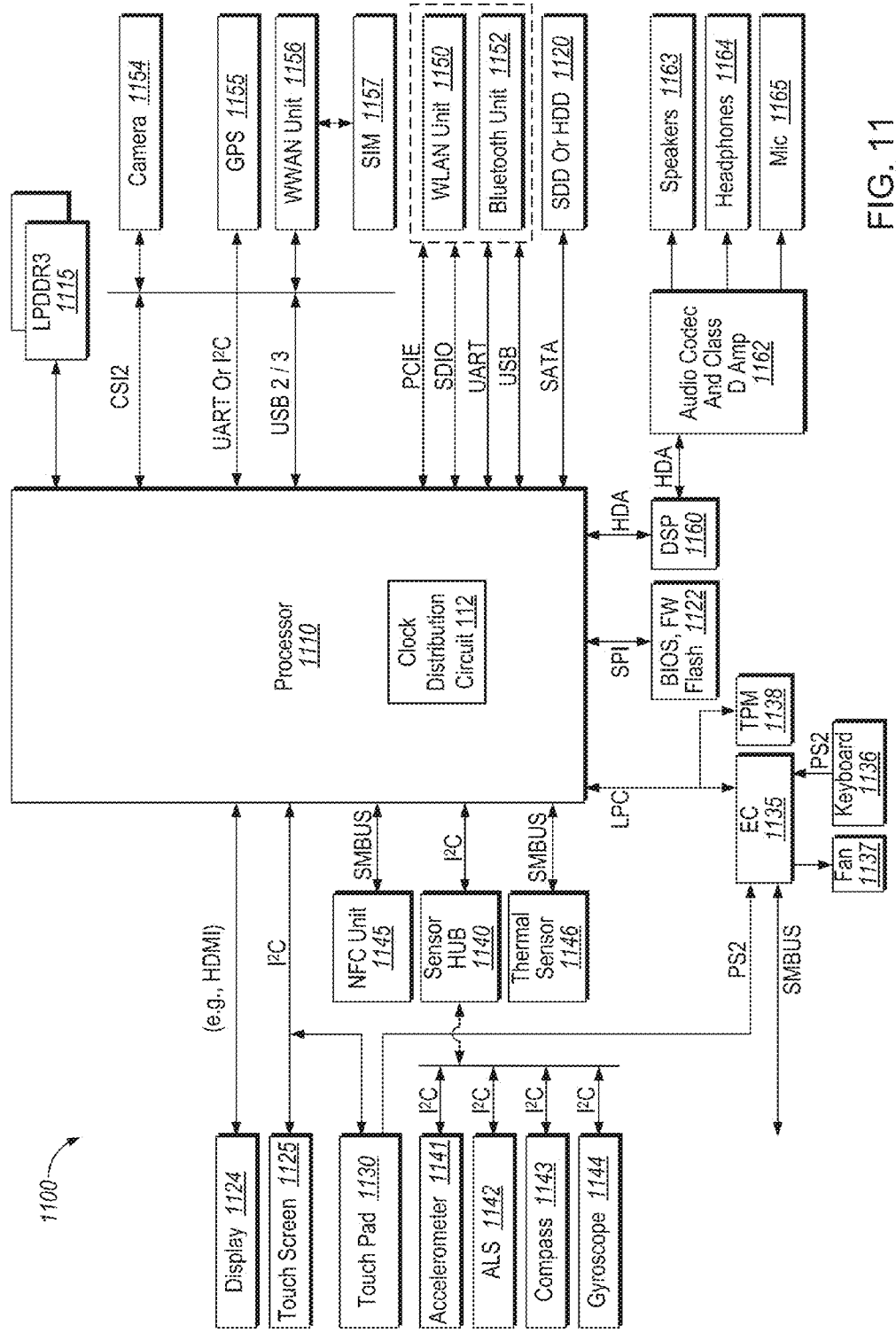
FIG. 11 is a block diagram of a computing system, according to an embodiment of the present disclosure.

Referring now to FIG. 11, a block diagram of components present in a computer system in accordance with an embodiment of the present disclosure is illustrated. As shown in FIG. 11, system 1100 includes any combination of components. These components can be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 11 is intended to show a high level view of many components of the computer system. However, it is to be understood that some of the components shown can be omitted, additional components can be present, and different arrangement of the components shown can occur in other implementations. As a result, the disclosure described above can be implemented in any portion of one or more of the interconnects illustrated or described below.

As seen in FIG. 11, a processor 1110, in one embodiment, includes a microprocessor, multi-core processor, multi-threaded processor, an ultra-low voltage processor, an embedded processor, or other known processing element. In one embodiment, the processor 1110 can include a clock distribution circuit 112 and the various connected I/O and connected devices (discussed below) can include a clock recovery circuit 162. In this way, the processor can act as a source device 104 for purposes of clock distribution as discussed herein, and the various connected I/O and other connected devices can act as a sink device 154 for purposes of recovering clock pulses, and reconstructing a clock employed by the processor 1110 for data communication.

In the illustrated implementation, processor 1110 acts as a main processing unit and central hub for communication with many of the various components of the system 1100. As one example, processor 1100 is implemented as a system on a chip (SoC). As a specific illustrative example, processor 1110 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters can instead be present in other embodiments such as an Apple A5/A6 processor, a Qualcomm Snapdragon processor, or TI OMAP processor. Note that many of the customer versions of such processors are modified and varied; however, they can support or recognize a specific instructions set that performs defined algorithms as set forth by the processor licensor. Here, the microarchitectural implementation can vary, but the architectural function of the processor is usually consistent. Certain details regarding the architecture and operation of processor 1110 in one implementation will be discussed further below to provide an illustrative example.

Processor 1110, in one embodiment, communicates with a system memory 1115. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices can be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And, other memory implementations are possible such as other types of memory modules, e.g., dual inline memory modules (DIMMs) of different varieties including but not limited to microDIMMs, Mini-DIMMs. In a particular illustrative embodiment, memory is sized between 2 GB and 16 GB, and can be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1120 can also couple to processor 1110. In various embodiments, to enable a thinner and lighter system design as well as to improve system responsiveness, this mass storage can be implemented via a solid state drive (SSD). However in other embodiments, the mass storage can primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 11, a flash device 1122 can be coupled to processor 1110, e.g., via a serial peripheral interface (SPI). This flash device can provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache can be configured as a single level cache (SLC) or multi-level cache (MLC) option to provide an appropriate level of responsiveness. In a SSD-only option, the module can be accommodated in various locations such as in a mSATA or NGFF slot. As an example, an SSD has a capacity ranging from 120 GB-1 TB.

Various input/output (I/O) devices can be present within system 1100. Specifically shown in the embodiment of FIG. 11 is a display 1124 which can be a high definition LCD or LED panel configured within a lid portion of the chassis. This display panel can also provide for a touch screen 1125, e.g., adapted externally over the display panel such that via a user's interaction with this touch screen, user inputs can be provided to the system to enable desired operations, e.g., with regard to the display of information, accessing of information and so forth. In one embodiment, display 1124 can be coupled to processor 1110 via a display interconnect that can be implemented as a high performance graphics interconnect. Touch screen 1125 can be coupled to processor 1110 via another interconnect, which in an embodiment can be an I$^2$C interconnect. As further shown in FIG. 11, in addition to touch screen 1125, user input by way of touch can also occur via a touch pad 1130 which can be configured within the chassis and can also be coupled to the same I$^2$C interconnect as touch screen 1125.

For perceptual computing and other purposes, various sensors can be present within the system and can be coupled to processor 1110 in different manners. Certain inertial and environmental sensors may couple to processor 1110 through a sensor hub 1140, e.g., via an I$^2$C interconnect. In the embodiment shown in FIG. 11, these sensors can include an accelerometer 1141, an ambient light sensor (ALS) 1142, a compass 1143 and a gyroscope 1144. Other environmental sensors can include one or more thermal sensors 1146 which in some embodiments couple to processor 1110 via a system management bus (SMBus) bus.

Using the various inertial and environmental sensors present in a platform, many different use cases can be realized. These use cases enable advanced computing operations including perceptual computing and also allow for enhancements with regard to power management/battery life, security, and system responsiveness. For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it can be determined whether a user is allowed to access certain secure documents. For example, a user can be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations can include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing can be disabled. Furthermore, when pairing a platform as described herein and a smartphone, an alarm can be configured to be triggered when the devices move more than a predetermined distance from each other, when in a public location. In contrast, when these paired devices are in a safe location, e.g., a work place or home location, the devices can exceed this predetermined limit without triggering such alarm.

Responsiveness can also be enhanced using the sensor information. For example, even when a platform is in a low power state, the sensors can still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases can be enabled using sensor information obtained via the integrated sensors within a platform as described herein, and the above examples are only for purposes of illustration. Using a system as described herein, a perceptual computing system can allow for the addition of alternative input modalities, including gesture recognition, and enable the system to sense user operations and intent.

In various embodiments, the accelerometer can be a 3-axis accelerometer having data rates of at least 50 Hz. A gyroscope can also be included, which can be a 3-axis gyroscope. In addition, an e-compass/magnetometer can be present. Also, one or more proximity sensors can be provided (e.g., for lid open to sense when a person is in proximity (or not) to the system and adjust power/performance to extend battery life). For some OS's Sensor Fusion capability including the accelerometer, gyroscope, and compass can provide enhanced features. In addition, via a sensor hub having a real-time clock (RTC), a wake from sensors mechanism can be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS can be a Microsoft® Windows® 8 OS that implements Connected Standby (also referred to herein as Win8 CS). Windows 8 Connected Standby or another OS having a similar state can provide, via a platform as described herein, very low ultra-idle power to enable applications to remain connected, e.g., to a cloud-based location, at very low power consumption. The platform can supports three power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 11, various peripheral devices may couple to processor 1110 via a low pin count (LPC) interconnect. In the embodiment shown, various components can be coupled through an embedded controller 1135. Such components can include a keyboard 1136 (e.g., coupled via a PS2 interface), a fan 1137, and a thermal sensor 1139. In some embodiments, touch pad 1130 can also couple to EC 1135 via a PS2 interface. In addition, a security processor such as a trusted platform module (TPM) 1138 in accordance with the Trusted Computing Group (TCG) TPM Specification Version 1.2, dated Oct. 2, 2003, can also couple to processor 1110 via this LPC interconnect. However, understand the scope of the present disclosure is not limited in this regard and secure processing and storage of secure information can be in another protected location such as a static random access memory (SRAM) in a security coprocessor, or as encrypted data blobs that are only decrypted when protected by a secure enclave (SE) processor mode.

In a particular implementation, peripheral ports can include a high definition media interface (HDMI™) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports can include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1100 can communicate with external devices in a variety of manners, including wirelessly. In the embodiment shown in FIG. 11, various wireless modules, each of which can correspond to a radio configured for a particular wireless communication protocol, are present. One manner for wireless communication in a short range such as a near field can be via a near field communication (NFC) unit 1145 which can communicate, in one embodiment with processor 1110 via an SMBus. Note that via this NFC unit 1145, devices in close proximity to each other can communicate. For example, a user can enable system 1100 to communicate with another, e.g., portable device such as a smartphone of the user via adapting the two devices together in close relation and enabling transfer of information such as identification information payment information, data such as image data or so forth. Wireless power transfer can also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 11, additional wireless units can include other short range wireless engines including a WLAN unit 1150 and a Bluetooth unit 1152. Using WLAN unit 1150, Wi-Fi™ communications in accordance with a given Institute of Electrical and Electronics Engineers (IEEE) 802.11 standard can be realized, while via Bluetooth® unit 1152 (of Bluetooth Special Interest Group), short range communications via a Bluetooth® protocol can occur. These units may communicate with processor 1110 via, e.g., a USB link or a universal asynchronous receiver transmitter (UART) link. Or these units may couple to processor 1110 via an interconnect according to a Peripheral Component Interconnect Express® (PCIe®) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which can be configured on one or more add-in cards, can be by way of the Next Generation Form Factor (NGFF) connectors adapted to a motherboard.

In addition, wireless wide area communications, e.g., according to a cellular or other wireless wide area protocol (WWAN), can occur via a WWAN unit 1156 which in turn may couple to a subscriber identity module (SIM) 1157. In addition, to enable receipt and use of location information, a GPS module 1155 can also be present. Note that in the embodiment shown in FIG. 11, WWAN unit 1156 and an integrated capture device such as a camera module 1154 may communicate via any of a number of protocols. In one embodiment, the camera module 1154 communicates via a given USB protocol such as a USB 2.0 or 3.0 link, or a UART or I²C protocol. In another embodiment, the camera modules 154 communicates via a Camera Serial Interface (CSI) such as CSI2. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows® 8 CS. This card can be configured in an internal slot (e.g., via an NGFF adapter). An additional module can provide for Bluetooth capability (e.g., Bluetooth® 4.0 with backwards compatibility) as well as Intel® Wireless Display functionality. In addition NFC support can be provided via a separate device or multi-function device, and can be positioned as an example, in a front right portion of the chassis for easy access. A still additional module can be a WWAN device that can provide support for 3G/4G/LTE and GPS. This module can be implemented in an internal (e.g., NGFF) slot. Integrated antenna support can be provided for WiFi™, Bluetooth®, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1160, which may couple to processor 1110 via a high definition audio (HDA) link. Similarly, DSP 1160 may communicate with an integrated coder/decoder (CODEC) and amplifier 1162 that in turn may couple to output speakers 1163 which can be implemented within the chassis. Similarly, amplifier and CODEC 1162 can be coupled to receive audio inputs from a microphone 1165 which in an embodiment can be implemented via dual array microphones (such as a digital microphone array) to provide for high quality audio inputs to enable voice-activated control of various operations within the system. Note also that audio outputs can be provided from amplifier/CODEC 1162 to a headphone jack 1164. Although shown with these particular components in the embodiment of FIG. 11, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1110 can be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR can be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1135. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 12:
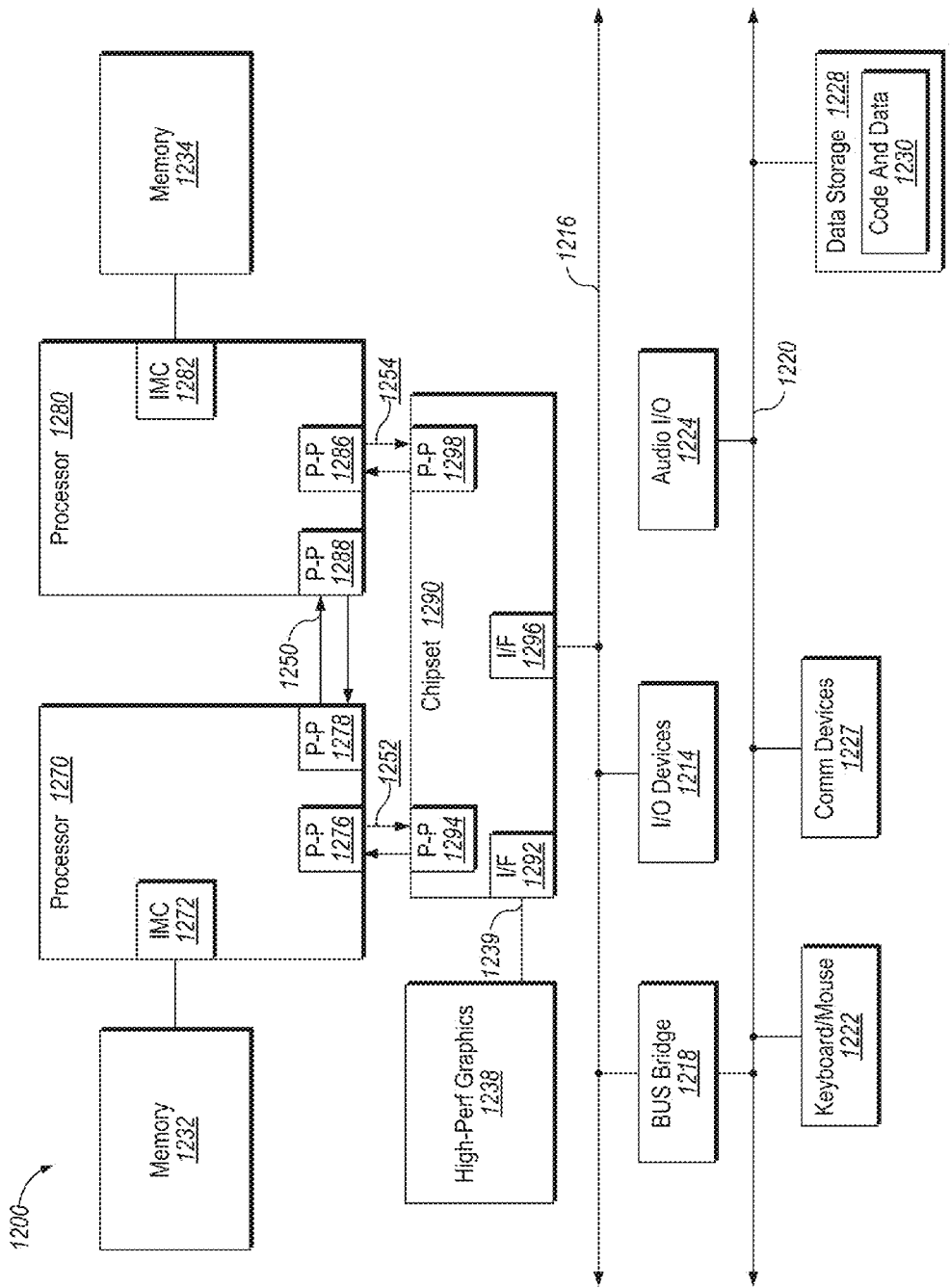
FIG. 12 is a block diagram of a computing system, according to another embodiment of the present disclosure.

Referring now to FIG. 12, shown is a block diagram of a second system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 can be some version of a processor. In one embodiment, 1252 and 1254 are part of a serial, point-to-point coherent interconnect fabric, such as Intel's Quick Path Interconnect (QPI) architecture. As a result, the disclosure can be implemented within the QPI architecture.

While shown with only two processors 1270, 1280, it is to be understood that the scope of the present disclosure is not so limited. In other embodiments, one or more additional processors can be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 can exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which can be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239. In one embodiment, the interface circuit 1292 includes the clock distribution circuit 112, and the high performance graphics circuit 1238 includes the clock recovery circuit 162. Accordingly, the interface circuit 1292 can distribute a clock distribution pattern and distribute a clock signal to the high performance graphics circuit 1238 according to the clock distribution pattern as discussed with reference to FIG. 1-7.

A shared cache (not shown) can be included in either processor or outside of both processors; yet connected with the processors via P-P interconnect, such that either or both processors' local cache information can be stored in the shared cache if a processor is placed into a low power mode.

Chipset 1290 can be coupled to a first bus 1216 via an interface 1296. In one embodiment, first bus 1216 can be a Peripheral Component Interconnect (PCI) bus, or a bus such as a PCI Express® bus or another third generation I/O interconnect bus, although the scope of the present disclosure is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system can implement a multi-drop bus or other such architecture.

In one embodiment, the interface 1296 includes one or more of clock distribution circuit 112 and any of the connected devices (off of first bus 1216 or the second bus 1220) includes a clock recovery circuit 162, according to the present disclosure. Accordingly, the interface circuit 1296 can distribute a clock distribution pattern and distribute a clock signal to any of the connected devices according to the clock distribution pattern as discussed with reference to FIG. 1-7.

The following examples pertain to further embodiments.

Example 1 is a source component comprising: 1) a clock source to generate a clock signal; 2) a plurality of front-end driver circuits to transmit signals to a sink component over a plurality of data lanes of an interconnect; and 3) a clock distribution circuit coupled to the clock source and the plurality of front-end driver circuits, wherein the clock distribution circuit is to distribute a first clock pulse of the clock signal on a first data lane of the plurality of data lanes and a second clock pulse of the clock signal on a second data lane of the plurality of data lanes.

In Example 2, the source component of Example 1, wherein the clock distribution circuit is further to distribute a plurality of sequential clock pulses of the clock signal on the plurality of data lanes according to a first clock distribution pattern known to the clock distribution circuit and the sink component.

In Example 3, the source component of Example 2, wherein the first clock distribution pattern comprises distribution of the plurality of sequential clock pulses sequentially across the plurality of data lanes and before data transmission, and wherein the clock distribution circuit is further to transmit, to the sink component, data comprising a second clock distribution pattern and a seed value, wherein the second clock distribution pattern is a polynomial that provides for pseudo-random shifting of a selected one of the plurality of data lanes over which a respective one of the plurality of sequential pulses of the clock signal is to be distributed, and the seed value is a seed for the polynomial.

In Example 4, the source component of Example 1, wherein the clock distribution circuit comprises logic to distribute individual clock pulses of the clock signal across select ones of the plurality of data lanes.

In Example 5, the source component of Example 1, wherein the clock distribution circuit is further to distribute a plurality of sequential clock pulses of the clock signal pseudo-randomly across the plurality of data lanes according to a clock distribution pattern.

In Example 6, the source component of claim 1, wherein the clock distribution circuit is further to distribute: i) the first clock pulse of the clock signal on the first data lane in a first clock cycle in which first data is transmitted on the second data lane; and ii) the second clock pulse of the clock signal on the second data lane during a second clock cycle in which second data is transmitted on the first data lane.

In Example 7, the source component of Example 1, wherein the clock distribution circuit comprises: 1) a pseudo-random number generator to generate a clock distribution pattern; 2) transmission control logic coupled to the pseudo-random number generator; 3) a multiplexer operatively coupled to the transmission control logic and to the plurality of front-end driver circuits, the multiplexer to: a) receive data for the plurality of data lanes on first inputs; b) receive a plurality of sequential clock pulses of the clock signal on second inputs; and c) output the sequential clock pulses interspersed amongst the data to the plurality of front-end driver circuits; 3) mapping logic to map a plurality of data source lanes to the first inputs; 4) distribution logic to receive the clock signal and to distribute the plurality of sequential clock pulses to respective ones of the second inputs according to the clock distribution pattern; and wherein the transmission control logic is to control the multiplexer and the pseudo-random number generator to distribute the plurality of sequential clock pulses of the clock signal within data distributed to the plurality of front-end driver circuits according to the clock distribution pattern.

Various embodiments can have different combinations of the structural features described above. For instance, all optional features of the computing system described above can also be implemented with respect to the method or process described herein and specifics in the examples can be used anywhere in one or more embodiments.

Example 8 is a sink component comprising: 1) a plurality of front-end receiver circuits to receive signals from a source component over a plurality of data lanes of an interconnect; and 2) a clock recovery circuit coupled to the plurality of front-end receiver circuits and to recover a first clock pulse of a clock signal from a first data lane of the plurality of data lanes and to recover a second clock pulse of the clock signal from a second data lane of the plurality of data lanes, wherein the clock recovery circuit includes clock reconstruction logic to reconstruct the clock signal from the first clock pulse and the second clock pulse.

In Example 9, the sink component of Example 8, wherein the clock recovery circuit is further to recover a plurality of sequential clock pulses of the clock signal according to a first clock distribution pattern known to the clock recovery circuit and to the source component.

In Example 10, the sink component of Example 9, wherein the first clock distribution pattern comprises distribution of the plurality of sequential clock pulses sequentially across the plurality of data lanes and before data reception, and wherein the clock recovery circuit is further to receive, from the source component, data comprising a second clock distribution pattern and a seed value, wherein the second clock distribution pattern is a polynomial that provides for pseudo-random shifting of a selected one of the plurality of data lanes over which a respective one of the plurality of sequential clock pulses is to be received, and the seed value is a seed for the polynomial.

In Example 11, the sink component of Example 8, wherein the clock recovery circuit comprises logic to select from select ones of the plurality of data lanes from which to recover individual clock pulses of the clock signal.

In Example 12, the sink component of Example 8, wherein the clock recovery circuit is further to recover a plurality of sequential clock pulses of the clock signal distributed pseudo-randomly across the plurality of data lanes according to a clock distribution pattern.

In Example 13, the sink component of Example 8, wherein the clock recovery circuit is further to recover: a) the first clock pulse of the clock signal on the first data lane in a first clock cycle in which first data is received on the second data lane; and b) the second clock pulse of the clock signal on the second data lane in a second clock cycle in which second data is received on the first data lane.

In Example 14, the sink component of Example 8, wherein the clock recovery circuit further comprises: 1) a pseudo-random number generator to generate a clock distribution pattern; 2) reception control logic coupled to the pseudo-random number generator; 3) a demultiplexer operatively coupled to the reception control logic and to the plurality of front-end receiver circuits, the demultiplexer to: a) receive, from the plurality of front-end receiver circuits, a plurality of sequential clock pulses of the clock signal interspersed amongst data; b) place the data from the plurality of data lanes on first outputs; and c) place the plurality of sequential clock pulses on second outputs; 4) mapping logic to map the data from the first outputs to a plurality of data sink lanes; and wherein the reception control logic is to control the demultiplexer to separate the sequential clock pulses from the data across the plurality of data lanes according to the clock distribution pattern, and wherein the clock reconstruction logic includes an exclusive OR (XOR) to combine the sequential clock pulses of the clock signal from the second outputs to reconstruct the clock signal.

Various embodiments can have different combinations of the structural features described above. For instance, all optional features of the computing system described above can also be implemented with respect to the method or process described herein and specifics in the examples can be used anywhere in one or more embodiments.

Example 15 is a method comprising: 1) sequentially distributing, by a source component to a sink component and without data, a plurality of sequential clock pulses of a clock signal across a plurality of data lanes of an interconnect between the source component and the sink component; 2) in response to the sink component reconstructing the clock signal from the plurality of sequential clock pulses recovered from the plurality of data lanes, transmitting a clock distribution pattern by the source component to the sink component over at least one of the plurality of data lanes; and 3) distributing with data, by the source component according to the clock distribution pattern, a first clock pulse of the clock signal on a first data lane of the plurality of data lanes and a second clock pulse of the clock signal on a second data lane of the plurality of data lanes.

In Example 16, the method of Example 15, wherein the distribution pattern defines a type of pseudo-random distribution of the clock signal to be performed over the plurality of data lanes between the source component and sink component.

In Example 17, the method of Example 15, wherein the distribution pattern comprises a polynomial that provides for pseudo-random shifting of a selected one of the plurality of data lanes over which a respective one of the plurality of sequential pulses of the clock signal is to be distributed, and wherein the transmitting further includes transmitting, with the clock distribution pattern, a seed value that is a seed for the polynomial.

In Example 18, the method of Example 17, further comprising the sink component: 1) detecting the clock distribution pattern and the seed value within a signal received from the source component; 2) recovering the plurality of sequential clock pulses of the clock signal from the plurality of data lanes according to the clock distribution pattern and the seed value; and 3) reconstructing the clock signal from the plurality of sequential clock pulses recovered from the plurality of data lanes.

In Example 19, the method of Example 15, wherein the distributing further comprises: 1) distributing the first clock pulse of the clock signal on the first data lane in a first clock cycle in which first data lane and first data is transmitted on the second data lane; and 2) distributing the second clock pulse of the clock signal on the second data lane in a second clock cycle in which second data is transmitted on the first data lane.

Various embodiments can have different combinations of the structural features described above. For instance, all optional features of the computing system described above can also be implemented with respect to the method or process described herein and specifics in the examples can be used anywhere in one or more embodiments.

Example 20 is a method comprising: 1) transmitting, by a source component to a sink component over an interconnect having a plurality of data lanes and after clock synchronization, a clock distribution pattern that defines a type of pseudo-random distribution of a plurality of sequential clock pulses of a clock signal from the source component to the sink component; and 2) pseudo-randomly distributing, by the source component while transmitting data to the sink component over the plurality of data lanes, the plurality of sequential clock pulses of the clock signal across the plurality of data lanes according to the clock distribution pattern.

In Example 21, the method of Example 20, further comprising sequentially distributing, by the source component before transmitting the clock distribution pattern, the plurality of sequential clock pulses of the clock signal to the sink component across the plurality of the data lanes, to synchronize the clock signal between the source component and the sink component and to provide lane-to-lane de-skew.

In Example 22, the method of Example 20, further comprising transmitting, without data and before the pseudo-randomly distributing by the source component, the plurality of sequential clock pulses pseudo-randomly across the plurality of the data lanes according to the clock distribution pattern, to train the sink component to reconstruct the clock signal from the plurality of sequential pulses recovered from the plurality of data lanes.

In Example 23, the method of Example 20, wherein the distribution pattern comprises a polynomial that provides for pseudo-random shifting of a selected one of the plurality of data lanes over which a respective one of the plurality of sequential pulses of the clock signal is to be distributed, and wherein the transmitting further includes transmitting, with the clock distribution pattern, a seed value that is a seed for the polynomial.

In Example 24, the method of Example 23, further comprising the sink component: 1) detecting the clock distribution pattern and the seed value within a signal received from the source component; 2) recovering the plurality of sequential clock pulses of the clock signal from the plurality of data lanes according to the clock distribution pattern and the seed value; and 3) reconstructing the clock from the plurality of sequential clock pulses recovered from the plurality of data lanes.

In Example 25, the method of Example 24, further comprising the sink component: 1) detecting data within the plurality of data lanes; and 2) mapping the data from respective data lanes onto a plurality of data sink lanes.

Various embodiments can have different combinations of the structural features described above. For instance, all optional features of the computing system described above can also be implemented with respect to the method or process described herein and specifics in the examples can be used anywhere in one or more embodiments.

Example 26 is a system comprising: 1) a memory in which to store data; 2) a source component coupled to the memory and to transmit the data, wherein the source component comprises: a) a clock source to generate a clock signal; b) a plurality of first front-end driver circuits to transmit signals to a sink component over a plurality of data lanes of an interconnect; and c) a clock distribution circuit coupled to the clock source and the plurality of front-end driver circuits, wherein the clock distribution circuit is to distribute a first clock pulse of the clock signal on a first data lane of the plurality of data lanes and a second clock pulse of the clock signal on a second data lane of the plurality of data lanes; and 3) a sink component communicatively coupled to the source component via the interconnect, wherein the sink component comprises: a) a plurality of second front-end receiver circuits to receive signals from the source component over the plurality of data lanes of the interconnect; and b) a clock recovery circuit coupled to the plurality of second front-end receiver circuits and to recover the first clock pulse of the clock signal from the first data lane of the plurality of data lanes and to recover the second clock pulse of the clock signal from the second data lane of the plurality of data lanes, wherein the clock recovery circuit includes clock reconstruction logic to reconstruct the clock signal from the first clock pulse and the second clock pulse.

In Example 27, the system of Example 26, wherein the clock distribution circuit is further to distribute a plurality of sequential clock pulses of the clock signal on the plurality of data lanes according to a first clock distribution pattern known to the clock distribution circuit and the sink component.

In Example 28, the system of Example 27, wherein the first clock distribution pattern comprises distribution of the plurality of sequential clock pulses sequentially across the plurality of data lanes and before data transmission, and wherein the clock distribution circuit is further to transmit, to the sink component, data comprising a second clock distribution pattern and a seed value, wherein the second clock distribution pattern is a polynomial that provides for pseudo-random shifting of a selected one of the plurality of data lanes over which a respective one of the plurality of sequential pulses of the clock signal is to be distributed, and the seed value is a seed for the polynomial.

In Example 29, the system of Example 26, wherein the clock recovery circuit comprises logic to select from select ones of the plurality of data lanes from which to recover individual clock pulses of the clock signal.

In Example 30, the system of Example 26, wherein the clock recovery circuit is further to recover: a) the first clock pulse of the clock signal on the first data lane in a first clock cycle in which first data is received on the second data lane; and b) the second clock pulse of the clock signal on the second data lane in a second clock cycle in which second data is received on the first data lane.

Various embodiments can have different combinations of the structural features described above. For instance, all optional features of the computing system described above can also be implemented with respect to the method or process described herein and specifics in the examples can be used anywhere in one or more embodiments.

Example 31 is a non-transitory computer-readable medium having comprising instructions that, when executed by a processor coupled to a source component, cause the source component to: 1) sequentially distribute, to a sink component and without data, a plurality of sequential clock pulses of a clock signal across a plurality of data lanes of an interconnect between the source component and the sink component; 2) in response to the sink component reconstructing the clock signal from the plurality of sequential clock pulses recovered from the plurality of data lanes, transmit a clock distribution pattern by the source component to the sink component over at least one of the plurality of data lanes; and 3) distribute with data, according to the clock distribution pattern, a first clock pulse of the clock signal on a first data lane of the plurality of data lanes and a second clock pulse of the clock signal on a second data lane of the plurality of data lanes.

In Example 32, the non-transitory computer-readable medium of Example 31, wherein the distribution pattern defines a type of pseudo-random distribution of the clock signal to be performed over the plurality of data lanes between the source component and sink component.

In Example 33, the non-transitory computer-readable medium of Example 31, wherein the distribution pattern comprises a polynomial that provides for pseudo-random shifting of a selected one of the plurality of data lanes over which a respective one of the plurality of sequential pulses of the clock signal is to be distributed, and wherein the transmitting further includes transmitting, with the clock distribution pattern, a seed value that is a seed for the polynomial.

In Example 34, the non-transitory computer-readable medium of Example 33, further comprising second instructions that, when executed by the processor, further cause the sink component to: 1) detect the clock distribution pattern and the seed value within a signal received from the source component; 2) recover the plurality of sequential clock pulses of the clock signal from the plurality of data lanes according to the clock distribution pattern and the seed value; and 3) reconstruct the clock signal from the plurality of sequential clock pulses recovered from the plurality of data lanes.

In Example 35, the non-transitory computer-readable medium of Example 31, wherein the instructions, when executed, further cause the source component to: 1) distribute the first clock pulse of the clock signal on the first data lane in a first clock cycle in which first data lane and first data is transmitted on the second data lane; and 2) distribute the second clock pulse of the clock signal on the second data lane in a second clock cycle in which second data is transmitted on the first data lane Various embodiments can have different combinations of the structural features described above. For instance, all optional features of the computing system described above can also be implemented with respect to the method or process described herein and specifics in the examples can be used anywhere in one or more embodiments.

Example 36 is a transmission system comprising: 1) means for transmitting, by a source component to a sink component over an interconnect having a plurality of data lanes and after clock synchronization, a clock distribution pattern that defines a type of pseudo-random distribution of a plurality of sequential clock pulses of a clock signal from the source component to the sink component; and 2) means for pseudo-randomly distributing, by the source component while transmitting data to the sink component over the plurality of data lanes, the plurality of sequential clock pulses of the clock signal across the plurality of data lanes according to the clock distribution pattern.

In Example 37, the transmission system of Example 36, further comprising means for sequentially distributing, by the source component before transmitting the clock distribution pattern, the plurality of sequential clock pulses of the clock signal to the sink component across the plurality of the data lanes, to synchronize the clock signal between the source component and the sink component and to provide lane-to-lane de-skew.

In Example 38, the transmission system of Example 36, further comprising means for transmitting, without data and before the pseudo-randomly distributing by the source component, the plurality of sequential clock pulses pseudo-randomly across the plurality of the data lanes according to the clock distribution pattern, to train the sink component to reconstruct the clock signal from the plurality of sequential pulses recovered from the plurality of data lanes.

In Example 39, the transmission system of Example 36, wherein the distribution pattern comprises a polynomial that provides for pseudo-random shifting of a selected one of the plurality of data lanes over which a respective one of the plurality of sequential pulses of the clock signal is to be distributed, and wherein the means transmitting further includes means for transmitting, with the clock distribution pattern, a seed value that is a seed for the polynomial.

In Example 40, the transmission system of Example 36, further comprising: 1) means for detecting the clock distribution pattern and the seed value within a signal received from the source component; 2) means for recovering the plurality of sequential clock pulses of the clock signal from the plurality of data lanes according to the clock distribution pattern and the seed value; and 3) means for reconstructing the clock from the plurality of sequential clock pulses recovered from the plurality of data lanes.

In Example 41, the transmission system of Example 40, further comprising: 1) means for detecting data within the plurality of data lanes; and 2) means for mapping the data from respective data lanes onto a plurality of data sink lanes.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to compression/decompression optimization in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. A source component comprising:
    a clock source to generate a clock signal;
    a plurality of front-end driver circuits to transmit signals to a sink component over a plurality of data lanes of an interconnect; and
    a clock distribution circuit coupled to the clock source and the plurality of front-end driver circuits, wherein the clock distribution circuit is to distribute a first clock pulse of the clock signal on a first data lane of the plurality of data lanes and a second clock pulse of the clock signal on a second data lane of the plurality of data lanes.

2. The source component of claim 1, wherein the clock distribution circuit is further to distribute a plurality of sequential clock pulses of the clock signal on the plurality of data lanes according to a first clock distribution pattern known to the clock distribution circuit and the sink component.

3. The source component of claim 2, wherein the first clock distribution pattern comprises distribution of the plurality of sequential clock pulses sequentially across the plurality of data lanes and before data transmission, and wherein the clock distribution circuit is further to transmit, to the sink component, data comprising a second clock distribution pattern and a seed value, wherein the second clock distribution pattern is a polynomial that provides for pseudo-random shifting of a selected one of the plurality of data lanes over which a respective one of the plurality of sequential pulses of the clock signal is to be distributed, and the seed value is a seed for the polynomial.

4. The source component of claim 1, wherein the clock distribution circuit comprises logic to distribute individual clock pulses of the clock signal across select ones of the plurality of data lanes.

5. The source component of claim 1, wherein the clock distribution circuit is further to distribute a plurality of sequential clock pulses of the clock signal pseudo-randomly across the plurality of data lanes according to a clock distribution pattern.

6. The source component of claim 1, wherein the clock distribution circuit is further to distribute:
    the first clock pulse of the clock signal on the first data lane in a first clock cycle in which first data is transmitted on the second data lane; and
    the second clock pulse of the clock signal on the second data lane during a second clock cycle in which second data is transmitted on the first data lane.

7. The source component of claim 1, wherein the clock distribution circuit comprises:
    a pseudo-random number generator to generate a clock distribution pattern;
    transmission control logic coupled to the pseudo-random number generator;
    a multiplexer operatively coupled to the transmission control logic and to the plurality of front-end driver circuits, the multiplexer to:
        receive data for the plurality of data lanes on first inputs;
        receive a plurality of sequential clock pulses of the clock signal on second inputs; and
        output the sequential clock pulses interspersed amongst the data to the plurality of front-end driver circuits;
    mapping logic to map a plurality of data source lanes to the first inputs;
    distribution logic to receive the clock signal and to distribute the plurality of sequential clock pulses to respective ones of the second inputs according to the clock distribution pattern; and
    wherein the transmission control logic is to control the multiplexer and the pseudo-random number generator to distribute the plurality of sequential clock pulses of the clock signal within data distributed to the plurality of front-end driver circuits according to the clock distribution pattern.

8. A sink component comprising:
    a plurality of front-end receiver circuits to receive signals from a source component over a plurality of data lanes of an interconnect; and
    a clock recovery circuit coupled to the plurality of front-end receiver circuits and to recover a first clock pulse of a clock signal from a first data lane of the plurality of data lanes and to recover a second clock pulse of the clock signal from a second data lane of the plurality of data lanes, wherein the clock recovery circuit includes clock reconstruction logic to reconstruct the clock signal from the first clock pulse and the second clock pulse.

9. The sink component of claim 8, wherein the clock recovery circuit is further to recover a plurality of sequential clock pulses of the clock signal according to a first clock distribution pattern known to the clock recovery circuit and to the source component.

10. The sink component of claim 9, wherein the first clock distribution pattern comprises distribution of the plurality of sequential clock pulses sequentially across the plurality of data lanes and before data reception, and wherein the clock recovery circuit is further to receive, from the source component, data comprising a second clock distribution pattern and a seed value, wherein the second clock distribution pattern is a polynomial that provides for pseudo-random shifting of a selected one of the plurality of data lanes over which a respective one of the plurality of sequential clock pulses is to be received, and the seed value is a seed for the polynomial.

11. The sink component of claim 8, wherein the clock recovery circuit comprises logic to select from select ones of the plurality of data lanes from which to recover individual clock pulses of the clock signal.

12. The sink component of claim 8, wherein the clock recovery circuit is further to recover a plurality of sequential clock pulses of the clock signal distributed pseudo-randomly across the plurality of data lanes according to a clock distribution pattern.

13. The sink component of claim 8, wherein the clock recovery circuit is further to recover:
the first clock pulse of the clock signal on the first data lane in a first clock cycle in which first data is received on the second data lane; and
the second clock pulse of the clock signal on the second data lane in a second clock cycle in which second data is received on the first data lane.

14. The sink component of claim 8, wherein the clock recovery circuit further comprises:
a pseudo-random number generator to generate a clock distribution pattern;
reception control logic coupled to the pseudo-random number generator;
a demultiplexer operatively coupled to the reception control logic and to the plurality of front-end receiver circuits, the demultiplexer to:
receive, from the plurality of front-end receiver circuits, a plurality of sequential clock pulses of the clock signal interspersed amongst data;
place the data from the plurality of data lanes on first outputs; and
place the plurality of sequential clock pulses on second outputs;
mapping logic to map the data from the first outputs to a plurality of data sink lanes; and
wherein the reception control logic is to control the demultiplexer to separate the sequential clock pulses from the data across the plurality of data lanes according to the clock distribution pattern, and wherein the clock reconstruction logic includes an exclusive OR (XOR) to combine the sequential clock pulses of the clock signal from the second outputs to reconstruct the clock signal.

15. A method comprising:
sequentially distributing, by a source component to a sink component and without data, a plurality of sequential clock pulses of a clock signal across a plurality of data lanes of an interconnect between the source component and the sink component;
in response to the sink component reconstructing the clock signal from the plurality of sequential clock pulses recovered from the plurality of data lanes, transmitting a clock distribution pattern by the source component to the sink component over at least one of the plurality of data lanes; and
distributing with data, by the source component according to the clock distribution pattern, a first clock pulse of the clock signal on a first data lane of the plurality of data lanes and a second clock pulse of the clock signal on a second data lane of the plurality of data lanes.

16. The method of claim 15, wherein the distribution pattern defines a pseudo-random distribution of the clock signal to be performed over the plurality of data lanes between the source component and sink component.

17. The method of claim 15, wherein the distribution pattern comprises a polynomial that provides for pseudo-random shifting of a selected one of the plurality of data lanes over which a respective one of the plurality of sequential pulses of the clock signal is to be distributed, and wherein the transmitting further includes transmitting, with the clock distribution pattern, a seed value that is a seed for the polynomial.

18. The method of claim 17, further comprising the sink component:
detecting the clock distribution pattern and the seed value within a signal received from the source component;
recovering the plurality of sequential clock pulses of the clock signal from the plurality of data lanes according to the clock distribution pattern and the seed value; and
reconstructing the clock signal from the plurality of sequential clock pulses recovered from the plurality of data lanes.

19. The method of claim 15, wherein the distributing further comprises:
distributing the first clock pulse of the clock signal on the first data lane in a first clock cycle in which first data lane and first data is transmitted on the second data lane; and
distributing the second clock pulse of the clock signal on the second data lane in a second clock cycle in which second data is transmitted on the first data lane.

20. A method comprising:
transmitting, by a source component to a sink component over an interconnect having a plurality of data lanes and after clock synchronization, a clock distribution pattern that defines a pseudo-random distribution of a plurality of sequential clock pulses of a clock signal from the source component to the sink component; and
pseudo-randomly distributing, by the source component while transmitting data to the sink component over the plurality of data lanes, the plurality of sequential clock pulses of the clock signal across the plurality of data lanes according to the clock distribution pattern.

21. The method of claim 20, further comprising sequentially distributing, by the source component before transmitting the clock distribution pattern, the plurality of sequential clock pulses of the clock signal to the sink component across the plurality of the data lanes, to synchronize the clock signal between the source component and the sink component and to provide lane-to-lane de-skew.

22. The method of claim 20, further comprising transmitting, without data and before the pseudo-randomly distributing by the source component, the plurality of sequential clock pulses pseudo-randomly across the plurality of the data lanes according to the clock distribution pattern, to train the sink component to reconstruct the clock signal from the plurality of sequential pulses recovered from the plurality of data lanes.

23. The method of claim 20, wherein the distribution pattern comprises a polynomial that provides for pseudo-random shifting of a selected one of the plurality of data lanes over which a respective one of the plurality of sequential pulses of the clock signal is to be distributed, and wherein the transmitting further includes transmitting, with the clock distribution pattern, a seed value that is a seed for the polynomial.

24. The method of claim 23, further comprising the sink component:
   detecting the clock distribution pattern and the seed value within a signal received from the source component;
   recovering the plurality of sequential clock pulses of the clock signal from the plurality of data lanes according to the clock distribution pattern and the seed value; and
   reconstructing the clock from the plurality of sequential clock pulses recovered from the plurality of data lanes.

25. The method of claim 24, further comprising the sink component:
   detecting data within the plurality of data lanes; and
   mapping the data from respective data lanes onto a plurality of data sink lanes.

\* \* \* \* \*